Garvey & Kimball,
Clothes Line Hook.
No. 108,776. Patented Nov. 1, 1870.
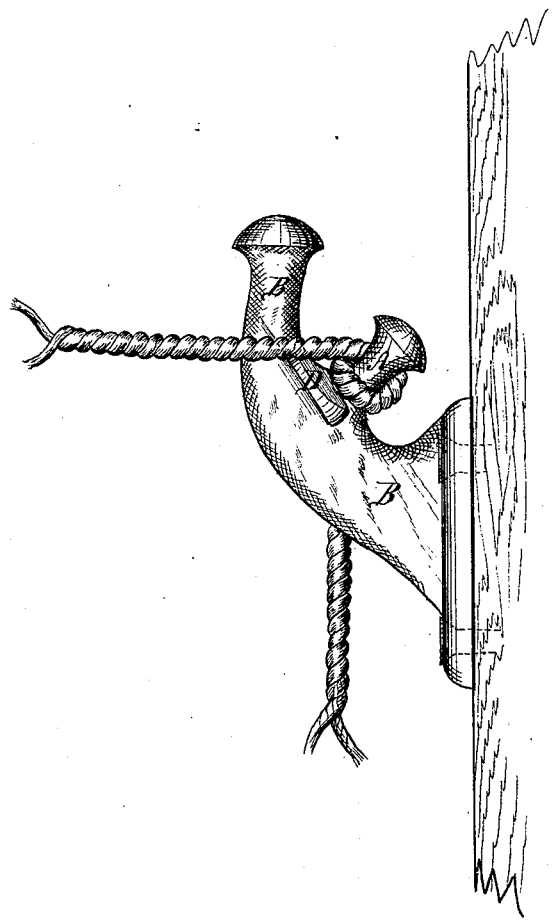
Witnesses:
George Pardy,
John Pardy,
Inventors
James Garvey
M. H. Kimball

United States Patent Office.

JAMES GARVEY AND MATTHEW H. KIMBALL, OF SAN FRANCISCO, CALIFORNIA.

Letters Patent No. 108,776, dated November 1, 1870.

IMPROVEMENT IN CLOTHES-LINE HOOKS.

The Schedule referred to in these Letters Patent and making part of the same.

*To all whom it may concern:*

Be it known that we, JAMES GARVEY and MATTHEW H. KIMBALL, both of the city and county of San Francisco, State of California, have invented a new and improved "Clothes-line Hook;" and we do hereby declare that the following is a full, clear, and exact description of the same, reference being had to the accompanying drawing making a part of this specification, in which—

Figure 2 is a view of our device used as a clothes-line hook.

This invention is intended as a means of securing, in a simple and convenient manner, ropes and lines, for any purpose where the device may be applicable, and it is more particularly designed for use on clothes-lines used to hang clothes upon to dry after being washed. The device, having enlarged proportions, may also be used to advantage on wharves, piers, ferry-boats, steamers, and vessels of all classes, offering, as it does, a simple and effective means for securing the hawser or tie-line which holds the vessel to her moorings.

There are many applications which readily suggest themselves, and in which the principle of our invention may be found useful, and which may be generally covered by stating that we contemplate using our invention in all cases where a rope or cord is to be secured firmly at a given point, and yet permitted to be instantly tightened up by "hauling in the slack."

To enable others skilled in the art to make and use our invention, we will describe it, as follows:

Referring to fig. 2 in the drawing, it will be seen that this application of the device varies from the common clothes-hook by having the addition of a knob or stem, A, projecting inward from the main bracket B. There will be the lips D D cast on the sides of the brackets, which will be suitably shaped to form a seat or bed, as it were, for the rope.

We may, if we wish, provide a loose roller or sleeve around the stem A; also, one may be fitted on the vertical stem at B, if required in any case; but ordinarily these rollers may be dispensed with.

The invention does not go beyond combining the knob or stem A, the lips D D, and the vertical stem B, and it is not material how the hook is secured to the wall or post to which it may be attached.

The operation of the hook is simple, and as follows:

Take the line or rope and form a loop, place the eye of the loop over the knob A, and let the crossed parts of the line pass one on each side of the vertical stem B; now the uppermost end of the line will be the part on which the weight or strain will come, and in bearing down on the part of the line underneath, at the crossing of the line, the pressure will be sufficient to prevent the line from slipping; the greater the weight or strain on the line, the less liability there will be to slip.

When it is desired to "take up the slack" it is only necessary to haul on the end of the line which passes underneath at the loop, and the line may be "tautened" with ease, all the slack which is taken in being firmly held.

What we claim as our invention, and desire to secure by Letters Patent, is as follows:

The clothes-line hook, consisting of the knob A, vertical stem B, and lips D D, as illustrated in fig. 2 of drawing, as and for the purposes set forth.

JAMES GARVEY.
MATTHEW H. KIMBALL.

Witnesses:
GEO. PARDY,
JOHN PARDY.